(12) United States Patent
Durairaj et al.

(10) Patent No.: US 12,555,111 B1
(45) Date of Patent: Feb. 17, 2026

(54) EXTENDED REALITY ACCOUNT MANAGEMENT WITH IRIS SCANNER BIOMETRIC AUTHENTICATION

(71) Applicant: UIPCO, LLC, San Antonio, TX (US)

(72) Inventors: Ravi Durairaj, San Antonio, TX (US); Marta Argumedo, Helotes, TX (US); Sean C. Mitchem, San Antonio, TX (US); Ruthie Lyle, Durham, NC (US); Nolan Serrao, Plano, TX (US); Bharat Prasad, San Antonio, TX (US); Nathan L. Post, Rockport, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 747 days.

(21) Appl. No.: 17/402,288

(22) Filed: Aug. 13, 2021

Related U.S. Application Data

(60) Provisional application No. 63/065,978, filed on Aug. 14, 2020.

(51) Int. Cl.
*G06Q 20/40* (2012.01)
*A61B 3/11* (2006.01)
(Continued)

(52) U.S. Cl.
CPC ........ *G06Q 20/40145* (2013.01); *A61B 3/112* (2013.01); *A61B 5/4845* (2013.01);
(Continued)

(58) Field of Classification Search
CPC ... G06Q 40/02; G06Q 20/351; G06F 16/9535
See application file for complete search history.

(56) References Cited

U.S. PATENT DOCUMENTS

| 8,675,925 B2 * | 3/2014 | Derakhshani | G06V 40/45 |
| | | | 382/117 |
| 8,724,851 B2 * | 5/2014 | Mellor | G06T 7/246 |
| | | | 382/103 |

(Continued)

FOREIGN PATENT DOCUMENTS

| AU | 2016262579 A1 * | 11/2017 | ....... G06Q 20/40145 |
| EP | 3549126 B1 * | 7/2023 | ............. H04N 23/20 |

(Continued)

*Primary Examiner* — Daniel S Felten
(74) *Attorney, Agent, or Firm* — Potomac Law Group, PLLC; Dannon G. Allbee

(57) ABSTRACT

Disclosed herein is an account management system, with biometric authentication. implementing user account actions via an extended reality device. A biometric authentication scheme can use an eyeprint (e.g., images or videos of the user's eyes) made using an eye scanner equipped on a head mounted extended reality device. In some embodiments, the images or videos include a pattern of eye gazing and/or a rate and degree of pupil dilation in response to light stimulus. An eyeprint password, based on the eyeprint, is compared to an expected template password established prior to the request of the user account action. The biometric authentication is applied as gating an account action performed from a user account, such as authorization of a transfer of account objects or categorization of account objects.

8 Claims, 11 Drawing Sheets

(51) Int. Cl.
*A61B 5/00* (2006.01)
*G06F 3/01* (2006.01)
*G06F 21/45* (2013.01)
*G06Q 20/10* (2012.01)
*G06V 40/19* (2022.01)
*H04L 9/40* (2022.01)

(52) U.S. Cl.
CPC ............ *G06F 21/45* (2013.01); *G06Q 20/102* (2013.01); *G06Q 20/4015* (2020.05); *H04L 63/083* (2013.01); *H04L 63/0861* (2013.01); *H04L 63/102* (2013.01); *G06F 3/017* (2013.01); *G06F 2221/2103* (2013.01); *G06V 40/19* (2022.01)

(56) References Cited

U.S. PATENT DOCUMENTS

| | | | | |
|---|---|---|---|---|
| 8,787,628 | B1 * | 7/2014 | Derakhshani | G06V 40/45 382/117 |
| 9,760,947 | B2 * | 9/2017 | Murray | G06Q 40/02 |
| 10,362,157 | B2 * | 7/2019 | Izutsu | H04L 67/02 |
| 10,454,906 | B1 * | 10/2019 | Sharfman | H04L 63/0428 |
| 10,922,677 | B2 * | 2/2021 | Song | G06F 21/32 |
| 11,069,143 | B2 * | 7/2021 | Kim | G06T 19/006 |
| 11,140,157 | B1 * | 10/2021 | Xia | H04L 63/0853 |
| 11,238,526 | B1 * | 2/2022 | Le chevalier | G06Q 30/0635 |
| 11,294,459 | B1 * | 4/2022 | Richman | G06F 21/84 |
| 11,479,177 | B2 * | 10/2022 | Oba | B60R 1/00 |
| 12,271,517 | B1 * | 4/2025 | Faeulhammer | G06F 3/011 |
| 2018/0107814 | A1 * | 4/2018 | Wu | G06F 3/013 |
| 2018/0150690 | A1 * | 5/2018 | Yin | A61B 3/0008 |
| 2020/0076813 | A1 * | 3/2020 | Felice-Steele | H04L 63/0861 |
| 2020/0160345 | A1 * | 5/2020 | Damania | G06V 40/70 |
| 2020/0229969 | A1 * | 7/2020 | Fix | A61B 3/0008 |
| 2020/0250284 | A1 * | 8/2020 | Diehl | G06F 21/32 |
| 2020/0394638 | A1 * | 12/2020 | Mcleod | G06Q 20/351 |
| 2021/0398504 | A1 * | 12/2021 | Lee | H04N 21/4363 |
| 2022/0075473 | A1 * | 3/2022 | Huang | G06F 1/1652 |
| 2022/0188833 | A1 * | 6/2022 | May | G06Q 20/40145 |
| 2023/0344827 | A1 * | 10/2023 | Mays | H04L 63/0861 |
| 2025/0013725 | A1 * | 1/2025 | Sanctis | H04L 65/403 |
| 2025/0225520 | A1 * | 7/2025 | May | G06Q 20/40145 |

FOREIGN PATENT DOCUMENTS

| | | | | |
|---|---|---|---|---|
| KR | 102440491 | B1 * | 4/2022 | |
| WO | WO-2016183541 | A1 * | 11/2016 | H04L 63/168 |
| WO | WO-2017067381 | A1 * | 4/2017 | G06Q 20/40 |

\* cited by examiner

610

Receive Application Action Request, where:

Access to the user account enables a user to view user account documents on a display of the XR device. A user, whom logged in with access to the user application, requests performance of a user account action. While logged in or within the user account, the user is enabled to review documents related to their account. A user account action can include choices or changes within the user account. For example, user account actions can include shifting of account objects to the control of another entity. The entity that receives control of the account objects may be another game player, a non-player character (NPC) that is typically controlled by a computer system, a bank, a store/retailer, a service provider, or another user. A user account action can include using an extended reality environment to schedule a payment from the account funds to a recipient assigned a particular category. In some embodiments, which accounts to transfer account objects between, the account objects transferred between the user and the other entity, authorization to make the transfer, a date on which to make the transfer, a category the transfer belongs to, a memo on the transfer, etc. are identified via gesture controls of the XR device.

*FIG. 6B*

EXTENDED REALITY ACCOUNT MANAGEMENT WITH IRIS SCANNER BIOMETRIC AUTHENTICATION

CROSS-REFERENCE TO RELATED APPLICATION

This application is a non-provisional of and claims priority to U.S. Provisional Application No. 63/065,978 filed on Aug. 14, 2020, entitled "EXTENDED REALITY ACCOUNT MANAGEMENT WITH IRIS SCANNER BIOMETRIC AUTHENTICATION," which is hereby incorporated by reference in its entirety for all purposes.

TECHNICAL FIELD

The present disclosure is directed to extended reality head mounted displays and more particularly to account management with security provided via iris scanners.

BACKGROUND

Head mounted displays have grown in popularity for virtual reality, augmented reality, and mixed reality (collectively "extended reality"). Yet extended reality head mounted displays have not efficiently provided account management solutions. Furthermore, extended reality head mounted displays tend to have limited security features.

In the field of information technology, the term "biometric authentication" typically refers to an automated system that uses measurable physiological features or behavioral characteristics of an individual to either determine or verify the identity of the individual. Physiological biometric features that are commonly used in biometric systems include fingerprints, the face, and various features of the eye. Behavioral biometrics characteristics that are commonly used in biometric systems include voice, keystrokes, and signatures.

In general, biometric identification involves first capturing a sample of a physiological feature from an individual. Capturing typically involves some form of optical scanning of the physiological feature. Next, distinctive characteristics are identified in the captured sample and a mathematical representation of the distinctive features (an enrollment template) is generated. The enrollment template is then stored for later comparison.

BRIEF DESCRIPTION OF THE DRAWINGS

FIG. 6B is an exemplary detailed description of block 610 of FIG. 6A.

The techniques introduced here may be better understood by referring to the following Detailed Description in conjunction with the accompanying drawings, in which like reference numerals indicate identical or functionally similar elements.

DETAILED DESCRIPTION

Figure 1:
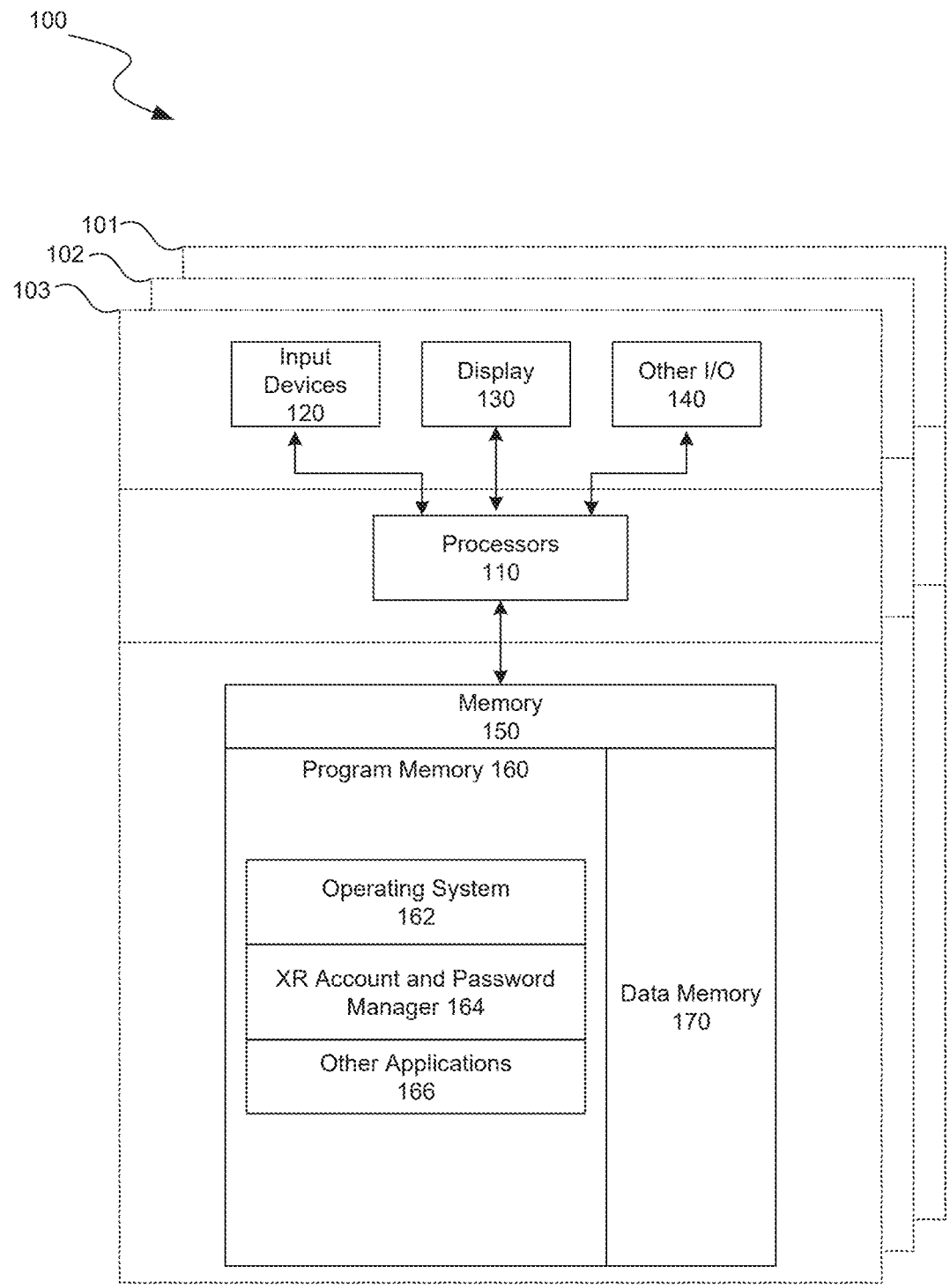
FIG. 1 is a block diagram illustrating an overview of devices on which some implementations of the present technology can operate.

Aspects of the present disclosure are directed to triggering account management functions with biometric authentication and implementing account management in extended reality.

In some implementations, when a user of an extended reality head mounted display device (XR device) initiates an account management function requiring authentication, the XR device can perform a password selection session. The XR device can include an iris scanner and/or gaze detection sensor that is enabled to capture an eyeprint used in the password selection session. From the captured eyeprint, the XR device can generate a key or password utilizing the eyeprint. There are a number of ways that an eyeprint may be converted into a password based on a set of password determination rules. Password determination rules may include making use of 1-to-1 comparisons to a key template, hashed or vectorized data generated from the eyeprint, or contribute the eyeprint as a single part in a larger key/password scheme (e.g., multi-factor authentication schemes).

Once captured, the eyeprint-based password is associated with a user account. Examples of a user account are an account associated with XR applications, a video game with saved profiles/progress, an online bank account, an online purchasing account, an online shopping account, a service provider account, and other suitable user accounts. Access to the user account enables a user to view user account interfaces on a display of the XR device, such as a payment portal, budgeting tool, shopping experience, etc.

In some embodiments, the eyeprint-based password is applied to confirm an action within a user account. That is, after the user is already logged into the account, the eyeprint-based password may be employed to perform account actions such as making changes within the user account. For example, such changes can include shifting of account objects to the control of another. Examples of account objects include game components, assets, inventory items, money (either fictional or real), etc. The entity that receives control of the account objects may be another game player, a non-player character (NPC) that is typically controlled by a computer system, a bank, a store/retailer, a service provider, or another user.

In some embodiments, the account objects transferred between the user and the other entity are identified via gesture controls of the XR device. Gesture controls are input collected via environment facing optical sensors on or in communication with the XR device. Gestures can be used to identify the specific accounts, account objects, and/or the amount of account objects. Prior to performing the action, the XR device can validate the current user of the XR device using a present eyeprint scan of the user. The present eyeprint scan can be converted in a manner matching the set of password determination rules. In this manner, the present eyeprint is compared with the stored password (e.g., image/hash/vector/etc. comparisons).

In some implementations, an account management display presented by an XR device can include multiple interfaces, such as a first interface for showing categories of account objects and a second interface for showing pending or upcoming actions in relation to the account objects. In some cases, the categories can show amounts available under each category and in yet further cases these amounts available can be established for particular time periods (e.g., a monthly allocation of account objects for that category).

Embodiments of the disclosed technology may include or be implemented in conjunction with an extended reality system. Extended reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Extended reality content may include completely generated content or generated content combined with captured content (e.g., real-world photographs). The extended reality content may include video, audio, haptic feedback, or some combination thereof, any of which may be presented in a single channel or in multiple channels (such as stereo video that produces a three-dimensional effect to the viewer). Additionally, in some embodiments, extended reality may be associated with applications, products, accessories, services, or some combination thereof, that are, e.g., used to create content in an extended reality and/or used in (e.g., perform activities in) an extended reality. The extended reality system that provides the extended reality content may be implemented on various platforms, including a head-mounted display (HMD) connected to a host computer system, a standalone HMD, a mobile device or computing system, a "cave" environment or other projection system, or any other hardware platform capable of providing extended reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Extended reality," "extra reality," or "XR," as used herein, refers to any of VR, AR, MR, or any combination or hybrid thereof.

Application of the diverse fields of input to XR systems enables additional security of access schemes. Typically, there are no biometrics applied to security of XR systems. New security schemes applied to XR systems improves the overall security of these devices and the safety of users on applications executed on XR systems.

Some existing XR systems include account management interfaces—e.g. by providing a flat browser panel through which a user can access account management tools designed for 2D interactions. However, these XR systems provide limited functionality—simply mimicking the traditional user experience of looking at a screen to browse the internet. User interactions with these existing XR systems interpret expressive input in three dimensions into simple point-and-click input for flat panels, severely limiting a user's ability to fully interact with account management tools. The XR account management tools for XR devices described herein overcome these problems associated with conventional XR interaction techniques and are expected to provide users with greater control over interactions with account, offer more functionality, and be more natural and intuitive than interactions in existing XR systems. Despite being natural and intuitive, the XR account management tools described herein are rooted in computerized extended reality systems, instead of being an analog of traditional web, app, telephone or other traditional account management systems. For example, existing interactions for account management use cramped 2D panels, fail to include ways to interpret gestures to perform actions, and require difficult to enter and easily lost credentials. The XR account management tools described herein, provide technical solutions with benefits of iris scanning security, gesture interpretation via cameras and machine learning interpretation models, and interfaces designed for three-dimensions which overcome these limitations of existing systems.

Several implementations are discussed below in more detail in reference to the figures. FIG. 1 is a block diagram illustrating an overview of devices on which some implementations of the disclosed technology can operate. The devices can comprise hardware components of a computing system 100 that forms the basis of an XR system. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage and can include both read-only and writable memory. For example, a memory can include one or more of random-access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, a XR account and password management application 164, and other application programs 166. Memory 150 can also include data memory 170 that can include an eyeprint, preconfigured templates for password generation, hand gesture patterns, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
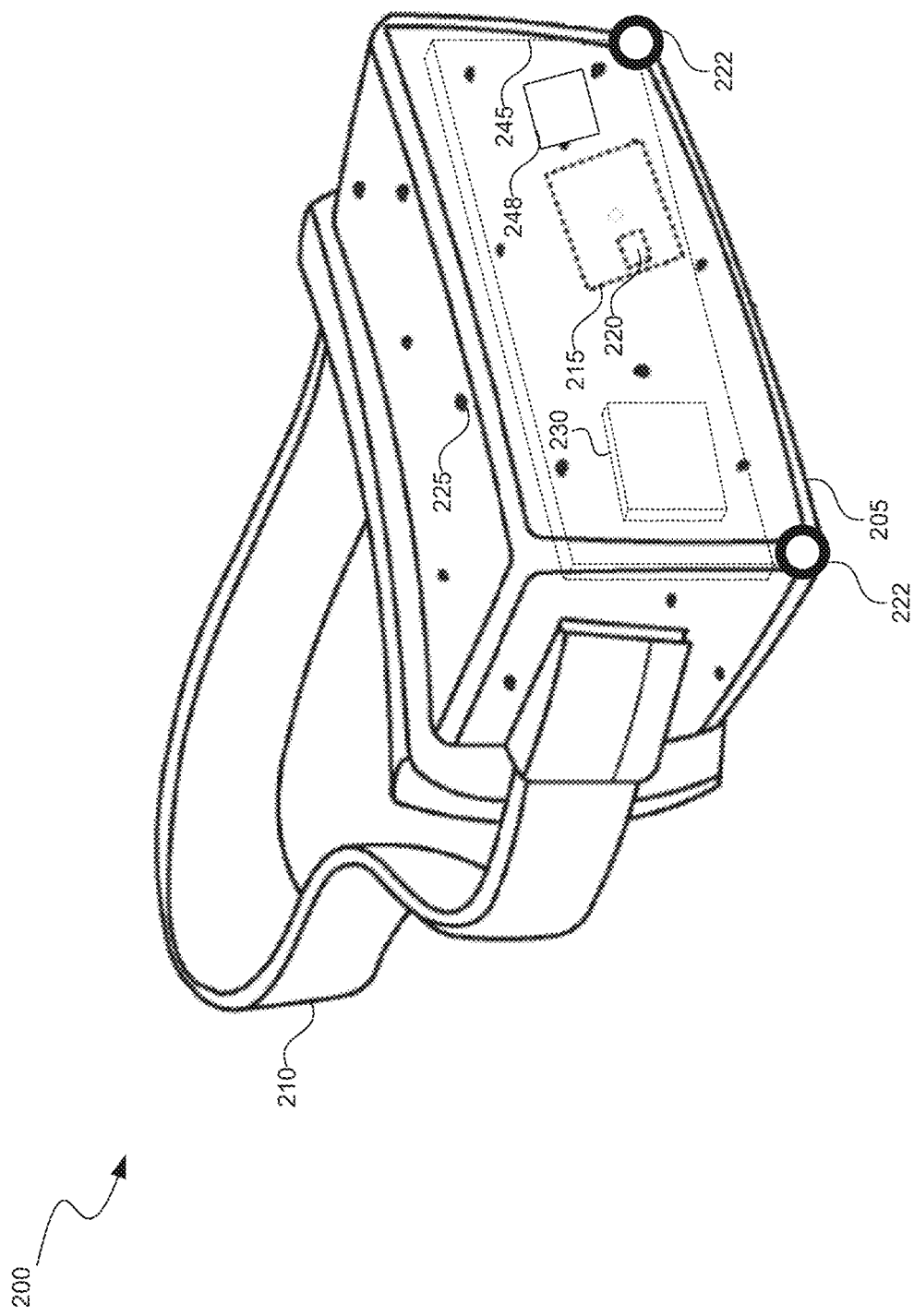
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, external environment cameras 222, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The external environment cameras 222 are used to image the surroundings of the wearer of the HMD 200. External environment cameras often make use of depth-sensing technology such as time-of-flight (ToF) or a phased ToF infrared camera. Alternatively, stereoscopic cameras or pseudo-stereoscopic imaging is used. Often included in the surroundings are the user's hands. The external environmental cameras image the user's hands in various positions in order to capture gestures.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

The HMD further includes one or more eye scanners 248. The eye scanner 248 captures images of the user's eyes along with identifying the direction the user's eyes are gazing. The user's gaze, or the motion of the user's eye, may be determined by tracking reflected light off the user's eye. This information may then be used to help correlate the users line of sight with respect to the projected image, a camera view, the external environment, and the like, and used in control techniques as described herein. For instance, the user may gaze at a location on the projected image and make a selection, such as with an external remote control, making a gesture, or with some detected eye movement (e.g. blinking). In an example of this technique, transmitted light, such as infrared light, may be reflected from the eye and sensed at the electronic display 245 (e.g. with a camera or other optical sensor).

The information may then be analyzed to extract eye rotation from changes in reflections. In embodiments, an eye tracking facility may use the corneal reflection and the center of the pupil as features to track over time; use reflections from the front of the cornea and the back of the lens as features to track; image features from inside the eye, such as the retinal blood vessels, and follow these features as the eye rotates; and the like. Alternatively, the eyepiece may use other techniques to track the motions of the eye, such as with components surrounding the eye, mounted in contact lenses on the eye, and the like. For instance, a special contact lens may be provided to the user with an embedded optical component, such as a mirror, magnetic field sensor, and the like, for measuring the motion of the eye. In another instance, electric potentials may be measured and monitored with electrodes placed around the eyes, utilizing the steady electric potential field from the eye as a dipole, such as with its positive pole at the cornea and its negative pole at the retina. In this instance, the electric signal may be derived using contact electrodes placed on the skin around the eye, on the frame of the eyepiece, and the like. If the eye moves from the center position towards the periphery, the retina approaches one electrode while the cornea approaches the opposing one. This change in the orientation of the dipole and consequently the electric potential field results in a change in the measured signal. By analyzing these changes, eye movement can be tracked.

A further embodiment of the eye scanner 248 may be used to provide biometric data collection and result reporting. Biometric data may be visual biometric data, such as iris biometric data. The eye scanner images the user's eyes enabling biometric comparisons. In some embodiments, the eye scanner 248 further is configured to shine light at the wearers eye in order to measure pupil adjustment in response to light stimulus.

Figure 2B:
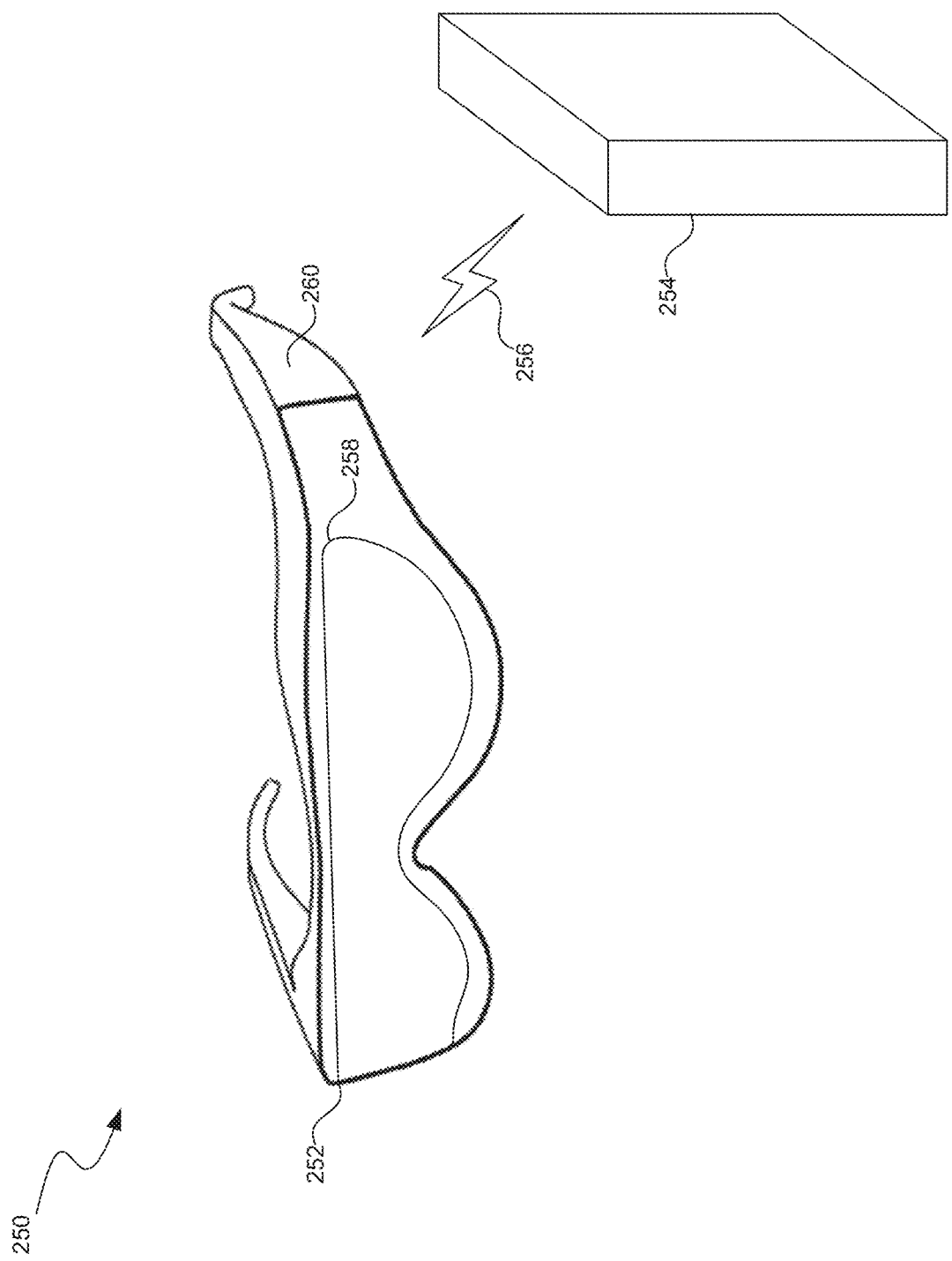
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3:
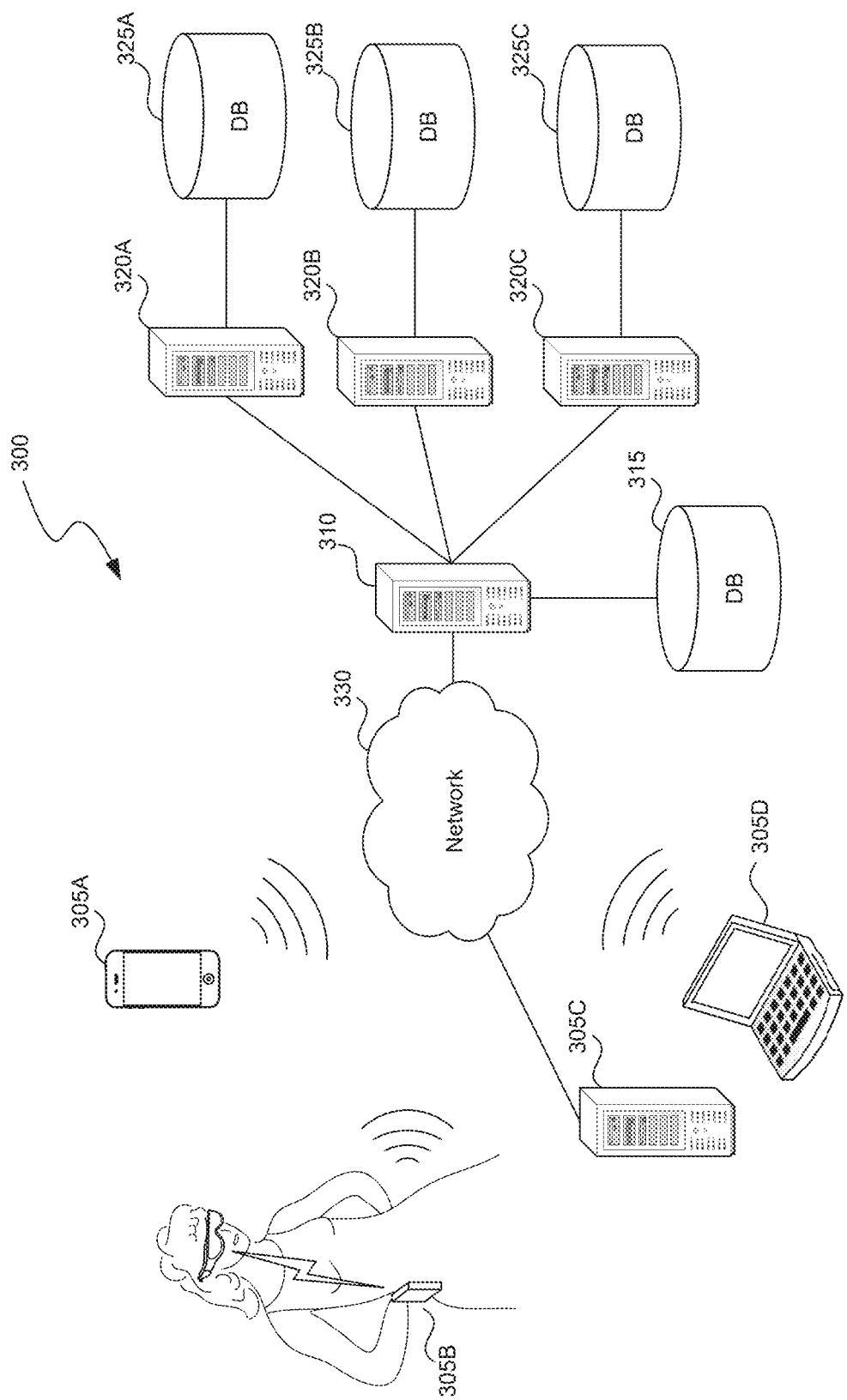
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
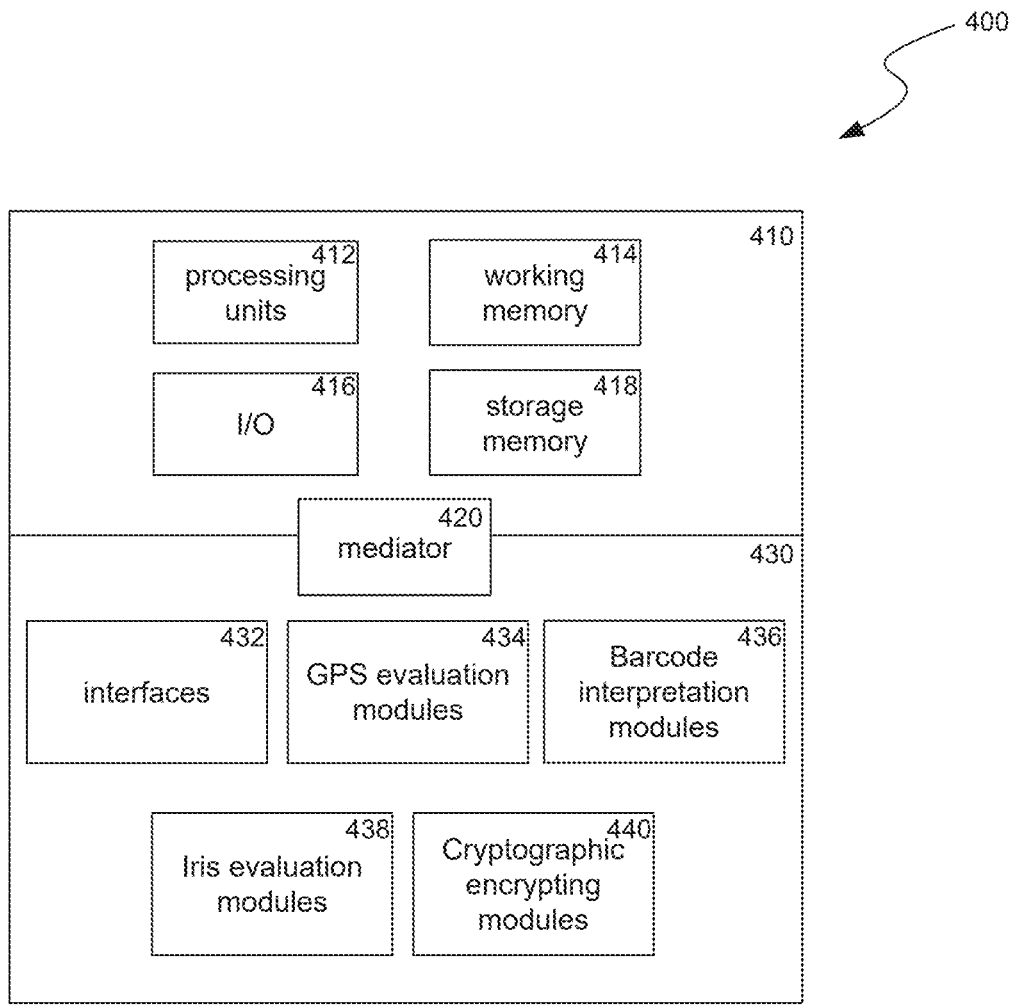
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for interfaces between budgeting and payment processing. Specialized components 430 can include GPS evaluation modules 434, barcode interpretation modules 436, iris evaluation modules 438, cryptographic encrypting modules 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

The GPS evaluation modules 434 identify the current location of the XR device via the use of a GPS sensor and then compare the location to mapping software. The mapping software indicates a purpose of structures at the present location (e.g., whether the location is a retail store and what kind of store it is). Given the purpose of the location, the GPS evaluation module then compares whether there are any account restrictions in place based on the present location of the XR device. In some embodiments, the user is restricted from performing some actions while at some predetermined locations. In some embodiments, location is based on wireless triangulation as opposed to a GPS sensor. Wireless triangulation often is performed via communication with multiple cell network base stations.

Barcode interpretation modules 436 interpret machine codes that are present on objects found in the physical world. The external environment cameras capture images of the machine code and the code is analyzed for content. Examples of machine codes include QR codes and barcodes. The content is then integrated into executing applications (e.g., a machine code is read as a price, and the price is imported as input into other applications executing on the XR device).

Iris evaluation modules 438 are configured to identify distinctive elements of a human iris. Distinctive portions of the human iris may be identified via heuristics and/or machine learning models that are trained on a large set of human iris images.

Similarly, cryptographic encrypting modules 440, are configured to operate a cryptographic protocol and encrypt captured images of a user's eyes such that they cannot be easily stolen by malicious actors and such that passwords are not stored in a human readable format. In some embodiments, the iris evaluation modules 438 are present on a backend server and current eye scans are encrypted by the cryptographic encryption module 440 prior to be transmitted to the backend server for validation.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
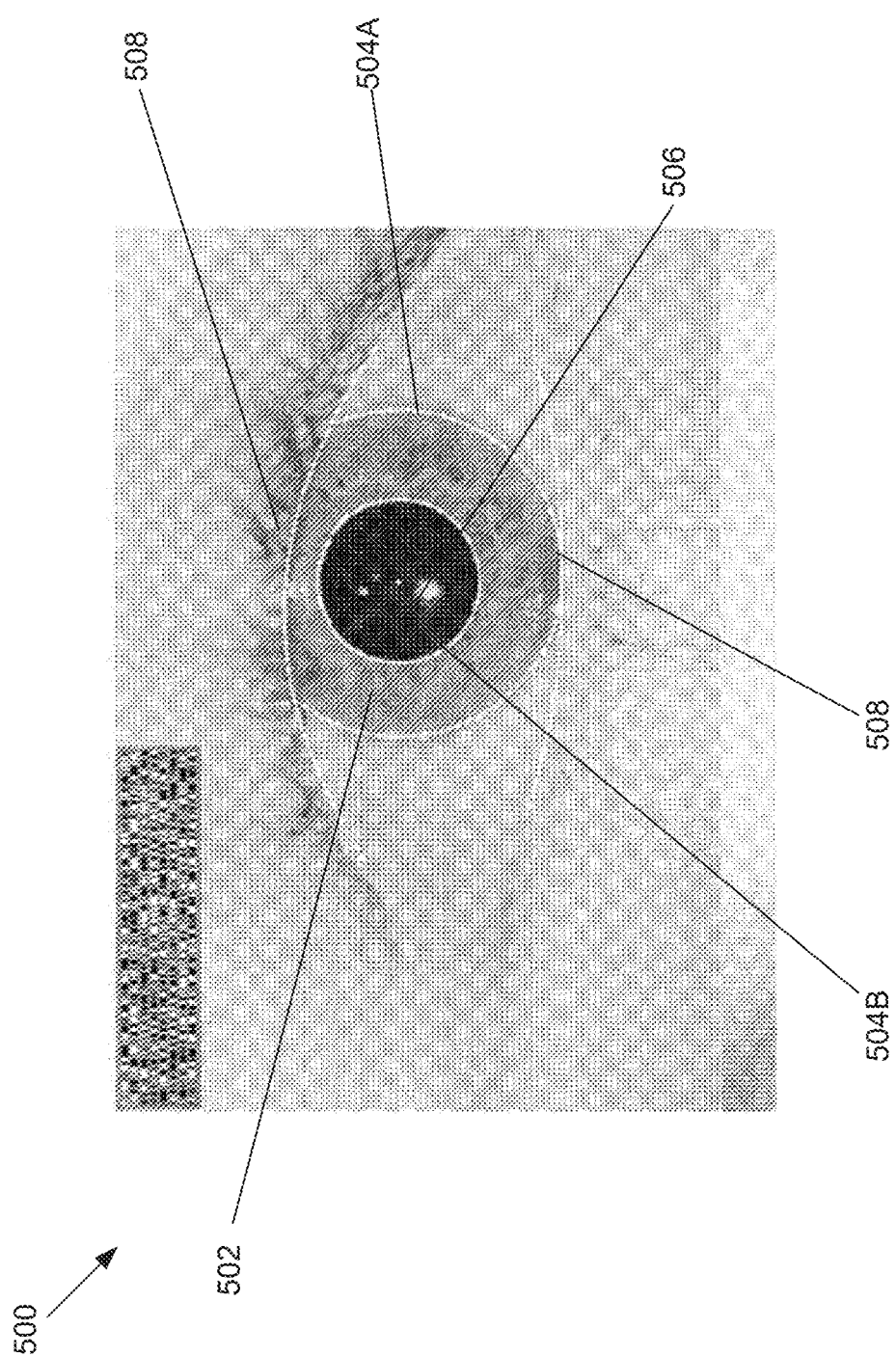
FIG. 5 is an illustration of an iris scan from an XR device.

FIG. 5 is a depiction of a user iris. Iris scanning uses pattern-recognition techniques of images of an individual's eyes. In the present technology, iris recognition the camera systems and illumination sources of the see-though head-mounted display embodiments discussed below create images of the iris. These images can be converted into patterned representations of the iris to identify a user. Visible or infrared imaging techniques may be used.

When processing an eyeprint image 500, enhancement processing occurs. The images may be processed to enhance contrast, reduce noise, and remove elements from the image that are not necessary for recognition. The iris region 502 is isolated. In some embodiments, methods for localization of the iris systems make use of first derivatives of image intensity to signal the location of edges that correspond to the borders of the iris 502. Any of a number of iris-recognition algorithms may be utilized to identify the approximately concentric circular outer boundaries 504A, B of the iris 502 and the pupil 506 in a photo of an eye. In practice, the inner boundary of the iris 500B, forming the pupil, can be determined by exploiting the fact that the boundary of the pupil 506 is essentially a circular edge. The pupil 506 is generally dark while the iris 502 is lighter, with varied pigmentation. Methods for detecting a pupillary boundary check for an abrupt and sudden change in brightness when summed along a circle. In one embodiment, the contour integral of an ellipse within the pupil 506 is calculated and the integral derivative in an axial direction of the ellipse is computed for increasing lengths of the axes. The same method may be used to detect the eyelid boundary 508.

The set of pixels covering only the iris is then transformed into a pattern that preserves the information that is used for a statistically meaningful comparison between two iris images. To authenticate via identification (one-to-many template matching) or verification (one-to-one template matching), a template created by imaging the iris 502 is compared to a stored value template in a database.

A matching pattern is calculated using one or more algorithms. Pattern matching comprises bringing the newly acquired iris pattern into spatial alignment with a candidate data base entry, choosing a representation of the aligned iris patterns that makes their distinctive patterns apparent, evaluating the goodness of match between the candidate and data base representations, and deciding whether there is a successful match. There exist many alternative methods for finding and tracking facial features such as the eyes. In some embodiments, the eyeprint image is hashed or translated into a vector then compared to a similarly hashed or vectorized eyeprint template.

In some embodiments, the eyeprint scan is captured as a video or set of frames. Across the set of frames, the user's eye is subjected to light stimulus and the rate and degree of pupil dilation is evaluated against the stored value template in a database. Where the eyeprint matches, but the pupil dilation rate/extent differs, the XR system can make a determination regarding the user's sobriety (i.e., whether the user is inebriated). Where a user is inebriated, some user account actions are deactivated by virtue of a non-matching current eyeprint to a sober, baseline eyeprint.

Figure 6A:
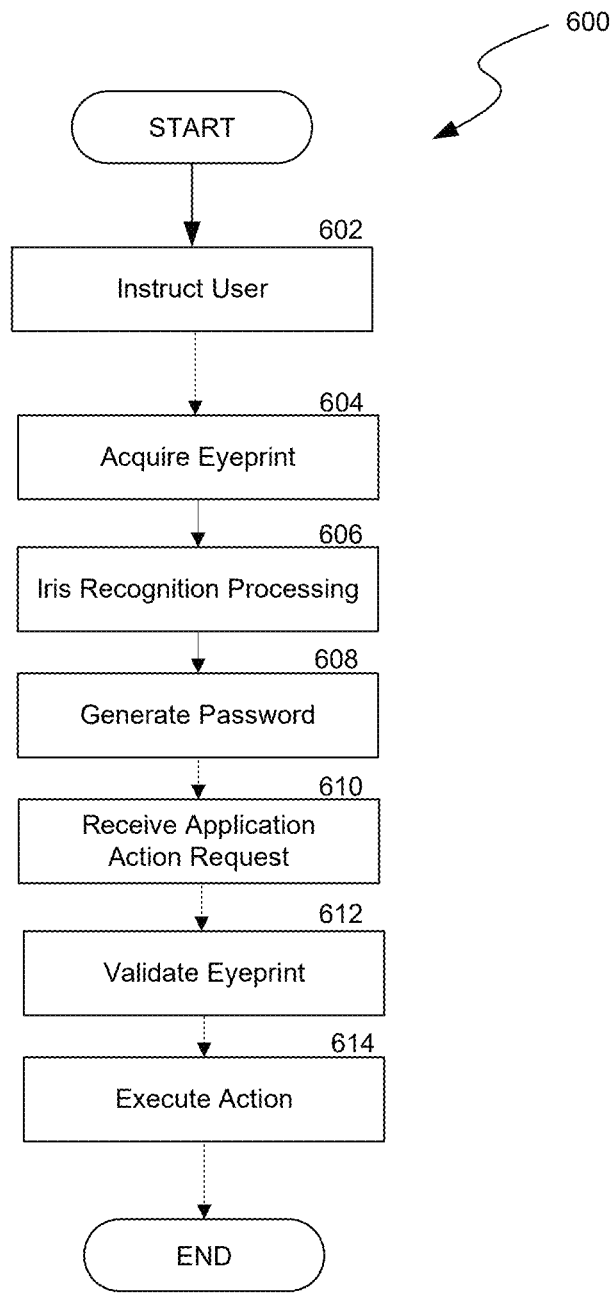
FIG. 6A is a flow diagram illustrating a process of performing user account actions by applying an ins scan as a security measure.

FIG. 6A is a flow diagram illustrating a process 600 of performing user account actions by applying an iris scan as a security measure. An example of an account action may include the authorization of a purchase of a good or service, a transfer of money from one user to another, or interacting with budgeting interfaces (as discussed in greater detail below in relation to FIG. 7). In some implementations, the process 600 can be initiated when a user requests such an account action, e.g., by selecting a user interface element provided through an extended reality application for one of these account actions. In other implementations, the process 600 can be initiated automatically based on a determined context that has been mapped to initiating a particular account action. For example, the XR device can identify a context for when a user is making a purchase or interacting will bills. Contexts can be determined using input from sensor and third-party data sources. For example, the purchasing context can rely on external facing cameras, GPS signals corresponding to retail locations, audio signals, etc., and which may be analyzed using a machine learning model trained on pairings of similar input with indications of when purchases are and are not being made. The XR device can be configured to initiate process 600 in response to identifying the purchase context. In yet further implementations, process 600 can be initiated when a user performs an action on an associated device, e.g., when a user selects an account action on her mobile device, the user can be offered the option to complete the account action with the greater functionality provided by her paired XR device. Upon confirmation from the user, the mobile device can transfer parameters of the account action the user selected to the XR device to complete the account action.

While the account action is initiated on the XR system, an eye scanner can be employed for scanning a user's eye to establish the user's identity. At step 602, a user may be instructed (via on screen displays or other means, such as audio signals) to begin an eyeprint password initialization process. Initially, the user is instructed to position their eye at a certain location and open their eyes wide to allow the camera(s) of the see-though head-mounted display a clear view of the iris. In some implementations, instead of providing these instructions to the user, the XR device can periodically or upon certain triggers (such as initiating process 600) authenticate the user, with the eye scanner, in the background. For example, when this authentication is triggered, the eye scanner can monitor the user's eye until it obtains an image useable for authentication (using block 604, described below). This allows the user the enhanced security of eye scanning authentication without the delay of having to perform an authentication process.

At 604, one or more images (or videos) of the user's eyes are made using the eye scanner. In some implementations, the one or more images can simple recognize a patterned representation of the iris (as discussed above in relation to FIG. 5). In some embodiments, the images or videos further capture a pattern of eye gazing. The eye gazing may be based on the user voluntarily looking at a personal selection of objects displayed on the XR device in an order as preferred by the user. For example, a user observes a grid of dots and follows a path of the dots with their eyes. In another example, a user looks at a selection of several pictures of animals in a preferred order. In a yet additional example, the user is provided with no images and is merely asked to move their eyes in some memorable pattern that is subsequently recorded during the eye scan.

In some cases, the eye scanner may stimulate the user's eyes with a light causing pupil dilation. A rate and amount of pupil dilation is recorded thereby setting a baseline for future comparison. In some implementations, the amount of pupil dilation individual users experience in response to amounts of light can be recorded and later used as a factor for determining the user's identify. In other cases, the pupil dilation is indicative of sobriety. During initialization, the XR system assumes that a rate and amount of pupil dilation over a certain threshold is considered sober and logs the baseline, which can be used as a unique characteristic of the user or as a comparison for sobriety. Where the rate and amount of pupil dilation is below the threshold, the XR system inquires with the user whether they are sober. Assuming that the user indicates that they are indeed sober, the baseline is logged. If the user was not truthful about their sobriety, and future validations of their eye dilate faster and to a greater degree, they will have to reset their eyeprint password.

At 606 iris recognition processing is performed. An exemplary method is described with reference to FIG. 5. A pattern determination algorithm is used to determine a pattern in the user's iris to a degree of accuracy required by the system. In one embodiment, as basic pattern is detected in order to allow the system to distinguish between a small number of users. In some embodiments, where the password is used inside of a user account the level of detail can be lower because there is only a single template to compare against (the template for the active user of the user account). In an alternative embodiment, a more detailed level of accuracy is utilized to further distinguish between a larger number of users.

There are a number of ways that an eyeprint may be converted into a password based on a set of password determination rules. Password determination rules may include making use of 1-to-1 comparisons to a key template, hashed or vectorized data generated from the eyeprint, or contribute the eyeprint as a single part in a larger key/password scheme (e.g., multi-factor authentication schemes, or a tiered password scheme). Where the eyeprint is a video or a series of images, the password determination rules may mix the images up in a predetermined sequence according to a key validation protocol.

A multi-factor authentication scheme involving an eyeprint password may further make use of other types of password such as a traditional text password, other biometric password, and/or out-of-band verification.

A tiered password scheme ties the eyeprint to an existing password as a replacement. That is, the XR device stores a siloed password in a datastore. The siloed password is the "real password" for purposes of accessing the relevant resource, but the eyeprint password provides access to siloed password. In this manner the eyeprint validation may be performed entirely locally (on the XR device), whereas the real password may be transmitted to a backend server for external validation. Where the eyeprint is a video or a series of images, the password determination rules may mix the images up in a predetermined sequence according to a key validation protocol.

Once captured, the eyeprint-based password is associated with the user account. Examples of a user account are an account associated with XR applications, video games with saved profiles/progress, online bank account, online purchasing account, online shopping, service provider account, and other suitable known user accounts. Access to the user account enables a user to view user account documents on a display of the XR device. The password can be associated with the user account by challenging the user of the XR device for login credentials to the user account to be supplied via an eyeprint scanner, wherein the login credentials include the password key, and in response to receiving the password key via the eyeprint scanner, providing access to the user account via the XR device.

At 610, a user, whom is logged in with access to the user application, requests performance of a user account action. FIG. 6B illustrates an exemplary detailed description of block 610. While logged in or within the user account, the user is enabled to review documents related to their account. Where the user account is associated with a bank, the documents may include the user's bank statements.

An example of a user account action, that the eyeprint-based password is applied to validate, may include choices or changes within the user account. For example, user account actions can include shifting of account objects to the control of another entity, allowing a user to categorize account objects, allocate account objects to timeframes, map scheduled shifts of account objects to the categorizations and/or timeframes, etc. Examples of account objects include game components, assets, or money (either fictional or real). The entity that receives control of the account objects may be another game player, a non-player character (NPC) that is typically controlled by a computer system, a bank, a store/retailer, a service provider, or another user. For example, a first user account action can include establishing a budget of account funds with various categories; a second user account action can include, using an extended reality environment to schedule a payment from the account funds to a recipient assigned a particular category; and a third user account action can include viewing the budget in the extended reality environment, which can include showing the scheduled payment in the budget category of the recipient. Additional details on user actions in relation to a budget are discussed in greater detail below in relation to FIG. 7.

In some embodiments, which accounts to transfer account objects between, the account objects transferred between the user and the other entity, authorization to make the transfer, a date on which to make the transfer, a category the transfer belongs to, a memo on the transfer, etc. are identified via gesture controls of the XR device. Gesture controls can be identified via external environment facing optical sensors on the XR device or in communication with the XR device, wearable devices (e.g., gloves, wrist bands, etc.), pressure sensors, etc. Where the user is paying a bill, they may not indicate an amount so much as they indicate that the bill should be paid at whatever amount the bill is for. In some embodiments, the account action is set for a time in the future or as a recurring action on a periodic schedule (e.g., monthly).

At 612, prior to performing the action, the XR device validates the current user of the XR device using a present eyeprint scan of the user. In some implementations, block 612 to validate the current user of the XR device using the present eyeprint scan of the user is performed prior to receiving the application action request, e.g., before granting the user access to the interface to make the application action request. The present eyeprint scan is converted in a manner matching the set of password determination rules. In this manner, the present eyeprint is compared with the stored password (e.g., image/hash/vector/etc. comparisons). Where the user's sobriety is evaluated, the user is prevented from making significant choices within their user account that they may regret later, while sober or requires a second confirmation that the user desires to make this transfer. For example, given time to reflect, a user may not really want to generate a stock purchase for a significant portion of their investment portfolio while intoxicated, or buy multiple trampolines.

At 614, after the XR system determines that the current eye scan matches the password template generated at step 608, and the user's identity and optionally the gaze pattern/sobriety are evaluated, the application executes the user account action within the user's account (e.g., shifting account objects to another entity, categorizing purchases, establishing a budget, reviewing account objects in relation to a budget, etc.)

In an illustrative embodiment, bills available on a user's bill pay application can be displayed in an extended reality environment provided by an XR device. The user would select the bill pay account, such as an electric bill account or a water bill account, through the XR device using a gesture. The user would then enter an amount through a display gesture interface through the XR device, such as a number display touch interface shown in the extended reality environment or using a voice command. The consumer would then click on a virtual "Pay" button shown in the extended reality environment using another gesture. A confirmation screen will display, in the extended reality environment, the bill pay account for which payment is being made and the amount to be paid to the bill pay account. The consumer would click on the "Submit" button to initiate the payment of the bill.

Figure 7:
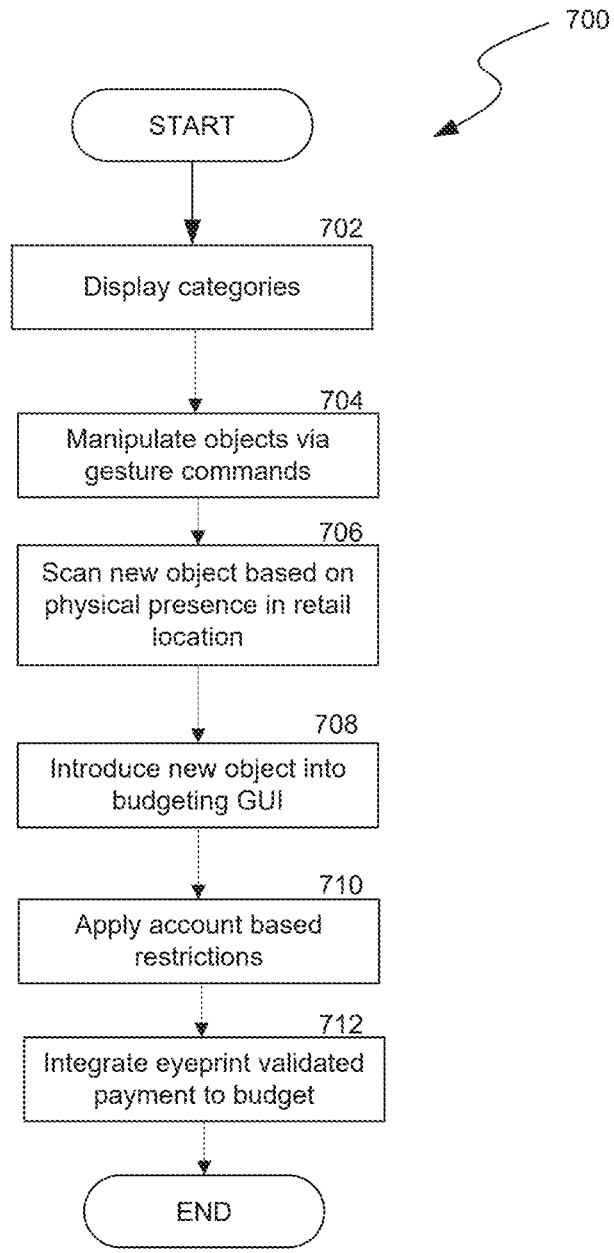
FIG. 7 is flow diagram illustrating a process where a user of the XR device can access a budgeting GUI within the user account.

FIG. 7 is flow diagram illustrating a process 700 where a user of the XR device is able to access a budgeting GUI within the user account. At 702, while in the user account the budgeting GUI displays different categories of expenses, amounts available under each category for that period's budget, and on the side, a list of bills due with the amount due could be displayed (see e.g., FIG. 9). At 704, the user, via gesture commands, manipulates a given budget item. Gesture commands can specify a category, change an items status, specify amounts, etc., by performing actions such as a drag and drop of a given budget to another location within the display, activate controls, issuing a voice command, pressing physical buttons, etc. Different budget items may be placed according to user preference and include grouping into categories. In some embodiments, gesture commands further enable the user to alter the color of the given budget items.

An XR device can provide a 3-dimensional space to display information (i.e., an extended reality environment), rather than the limited 2-D space of the smart phone, smart watch, or browser-based applications. For example, these interactions provide the opportunity to simultaneously display different dimensions of information. The difference is between being able to experience interactions with 3D models (e.g., representations of budget categories or payees, activate controls with more meaning, see richer results) and merely receiving information in the confines of a smartphone or 2D computer screen. The experience is much richer and immersive, requiring more complexity of design and technology implementation.

At 706, a user may attempt to add a new budget item to the budgeting GUI. In some implementations, this can be an automated process where the XR device automatically identifies a purchase based on information from an external camera, an integration with a point-of-sale device, information received from a purchase account (e.g., the users credit card or bank account). For example, a user at a book store indicates via gesture commands they wish to purchase a book. External environmental cameras of the worn XR device scan the barcode on the book and identify the book's price. In other implementations, the user can manually add the budget item, e.g., though voice command, gestures, etc. In some implementations, the budget can be multi-platform where users can add budget items via the XR device or another device (such as a mobile phone) and the user can view the updated budget, reflecting the new budget item, in the extended reality environment.

At 708, the new budget item enters the budgeting GUI and information regarding the new budget item is displayed by the XR device. In some embodiments the GUI indicates whether the new budget item fits the current budget plan. Where the item does not meet a current budget plan, associated banking or payment processing software is prevented from executing the purchase or notifies the user the purchase does not conform to the budget and requests the user confirm the purchase. In some implementations, the new budget item can be a result of an account action (see FIG. 6A) such as a scheduled bill payment.

At 710, budgetary restrictions are applied to the user's account. In some embodiments, simultaneously, less expensive or better-quality options are displayed on alongside the new budget item or as virtual objects alongside the item being purchased. The user can select the alternate options with gesture commands and activate hyperlinks associated with the display objects for the alternate purchasing options. The hyperlinks open additional purchasing portals on the XR device (e.g., a web page or native XR application) and may include purchase links to the alternate items. In some embodiments, location-based services can be used to limit purchases based on a predefined budget.

The XR device can compare GPS coordinates to mapping software to identify a retail location of the user. Based on characteristics of the retail location (e.g., a store that is tagged as very expensive, or a store that sells addictive products) identified via GPS coordinates, the system may restrict the user from spending money or confirm a purchase. Budget information could be passed to the XR device on demand. For example, a mother allows her son to go to the movies and he uses an XR device for purchases. At only the GPS location of the theater, his budget would include entry to the movie and a small popcorn and bottled water. If, however, he tried to purchase a large popcorn and a soda his purchase would be denied, and an alert would be sent back to his mother. At any other location, no purchase would be allowed. In another embodiment this could include a request for an override.

In some embodiments the user sets their preferences to receive alerts, coupons, and info about similar items in the store, nearby stores. This info is displayed in the peripheral vision of the XR device. A user would typically use their phone only when they need to. The XR device could receive alerts in the peripheral vision during a user's normal activity, without the user having to hold any device in their hand.

At 712, the budgeting GUI imports a payment made based on an eyeprint validated user account action (e.g., as described in FIG. 6A) to the budgeting GUI. The new payment is applied to current budget models and the models update. In some embodiments, the new payment is a recurring payment. The recurring payment is then applied to a series of monthly budgets.

Figure 8:
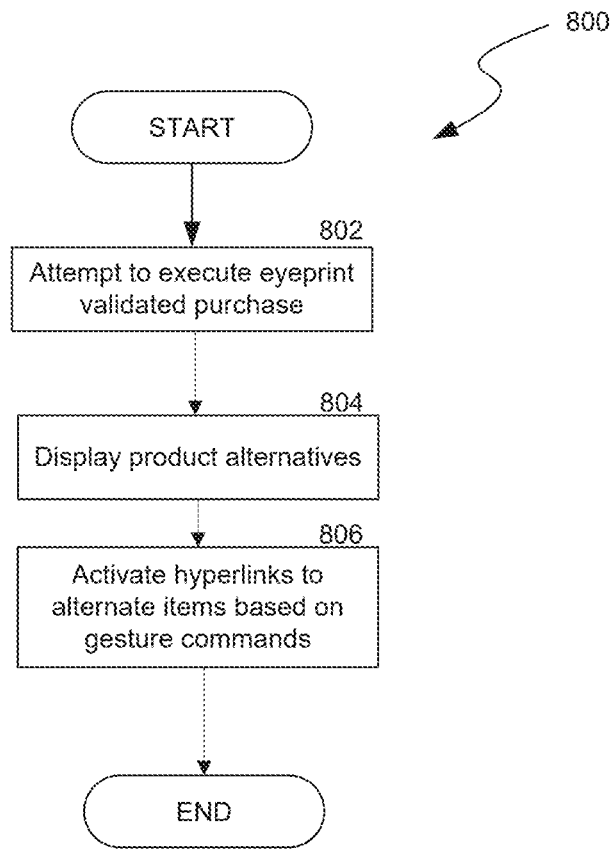
FIG. 8 is a flow diagram illustrating a process where prior to an eyeprint validated purchase alternatives are displayed to the user.

FIG. 8 is a flow diagram illustrating a process 800 where, prior to an eyeprint validated purchase, alternatives are displayed to the user. At 802, the user attempts to make a purchase as described in FIG. 6A. The user is challenged for their current eyeprint prior to making the purchase. At 804, a pay icon is displayed and less expensive or better-quality options are displayed alongside the current purchase. At 806, The user can select the alternate options with gesture commands, voice commands, etc., and can activate hyperlinks associated with the display objects for the alternate purchasing options. When the alternatives are manipulated using gesture commends, the XR device can display additional information regarding the alternatives. The additional information may include a price, a purchase location, a make and model, images of the alternative, hyperlinks for the alternatives, customer reviews, etc. The hyperlinks open additional purchasing portals on the XR device and may include purchase links to the alternate items. The alternate items are suggested based on budgeting software working in conjunction with the payment processing software.

Figure 9:
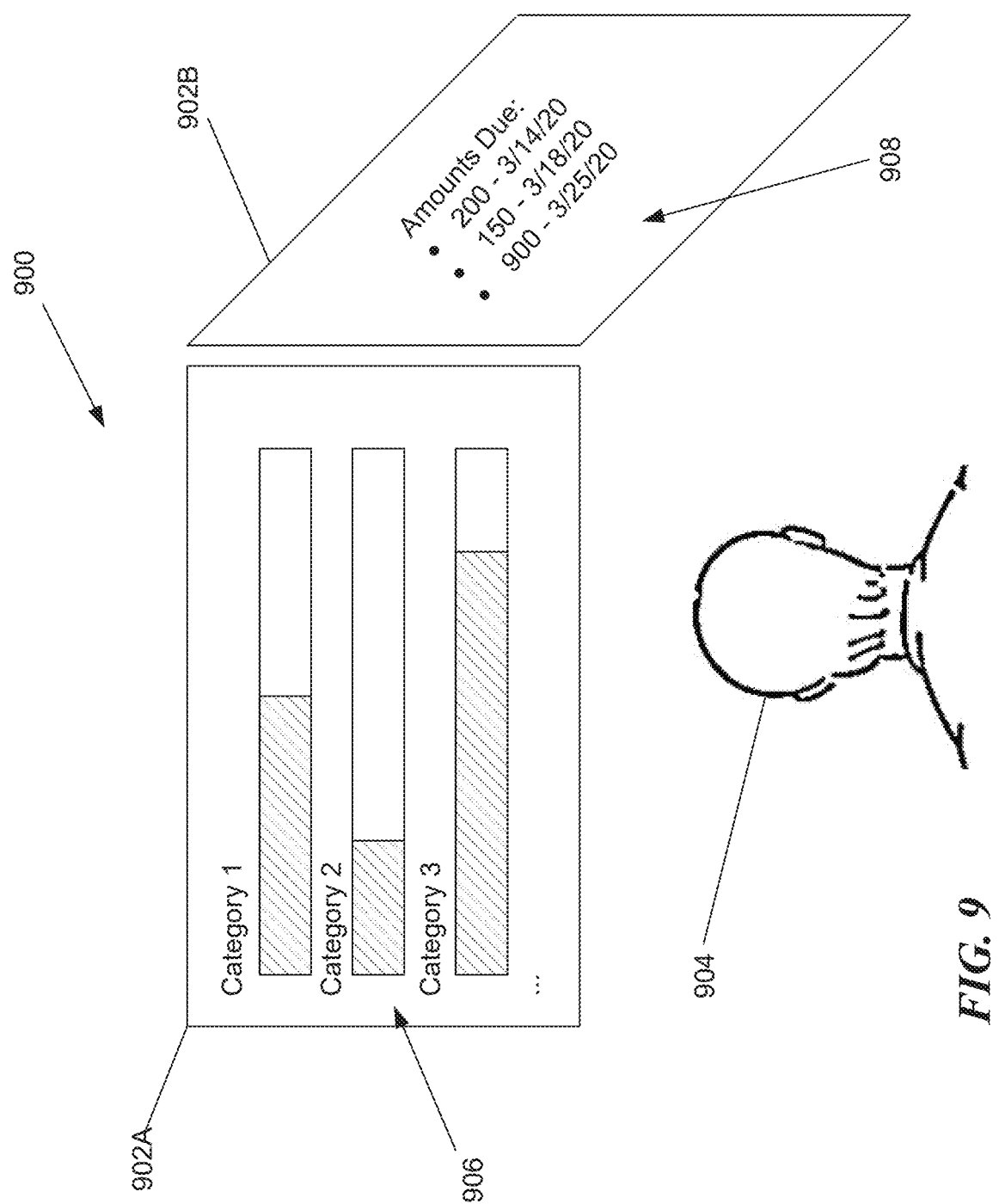
FIG. 9 is an example of a budgeting GUI in an extended reality environment within a user account.

FIG. 9 is an example of a budgeting GUI 900 in an extended reality environment within a user account. The budgeting GUI 900 includes panels 902 (902A and 902B) that display information to the user 904 via the XR device. Displayed on the panels 902 are different categories of expenses, amounts available under each category for that period's budget, and a list of bills due with the amount due.

Panel 902A displays a set of budgeting categories 906. The budgeting categories 906 are "grabbable." Grabbable refers to the ability to perform a hand gesture adjacent to a given item that unlocks the position of that item, and causes the item to follow the hand of the user 904 until the user "sets down" the item by performing an additional hand gesture command. Once "set down" the item locks into the new location until grabbed again.

Grabbable items are similar to the mouse-controlled action of "drag and drop" known in the art; however, grabbable items are executed via hand gestures. When grabbing budget categories 906, the user 904 may manipulate and shift position/orientation relative to one another and shift the amount of money in a given category.

A second panel 902B displays a set of invoices 908. The invoices relate to bills received by the user 904 and may be configured as budgeting categories 906. The invoices are similarly grabbable and may be dropped into specific budgeting categories 906 automatically applying that invoice to the specific budgeting category 906. In some embodiments, dropping an invoice on a given budget category issues a command within the XR device to pay that invoice from that budget category (the pay action may be verified by eyeprint as described elsewhere herein).

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

The invention claimed is:

1. An extended reality device ("XR device") comprising:
one or more displays;
one or more external environment facing cameras;
one or more eye scanners;
one or more processors; and
one or more memories storing computer-executable instructions that, when executed by the one or more processors, cause the XR device to perform a process, the process comprising:
  initiating monitoring, to operate in the background of the XR environment by the one or more eye scanners, of an eye of a user wearing the XR device to capture eyeprints, usable for authentication, of the user wearing the XR device;
  performing an eyeprint based password setup procedure comprising:
    initiating a password selection session on the XR device;
    generating a session password utilizing a session eyeprint of a user wearing the XR device, captured by the one or more eye scanners, wherein the session password is generated according to a set of password determination rules; and
    associating the session password with an account of the user wearing the XR device, wherein the account has one or more recipient entities associated therewith;
  displaying, in the XR environment on the one or more displays, the one or more recipient entities associated with the account;
  detecting a transfer action command that is mapped to heightened security and, in response, identifying that a background authentication trigger has occurred requiring validation of the current user,
    wherein the detecting the transfer action command, that is mapped to heightened security, comprises detecting, in the XR environment, one or more user hand gesture inputs to which the transfer action, mapped to heightened security, corresponds, and
    wherein the detecting the one or more user hand gesture inputs includes identifying, via the environment-facing camera of the XR device, a hand gesture indicating:
      an amount of user account objects, and
      a recipient entity of the displayed one or more recipient entities;
  in response to the identifying that the authentication trigger has occurred and prior to performing the transfer action, validating, in the XR environment, the current user to execute the transfer action by comparing the session password to a current password generated utilizing a present eyeprint of the current user captured by the user-facing camera in a background process of the XR device, wherein the current password is generated according to the set of password determination rules;
  scheduling, via user input received by the XR device, the transfer action to be performed periodically as a scheduled periodic execution of the transfer action;
  updating a budget based on the scheduled periodic execution of the transfer action; and
  displaying, by the XR device, one or more budgeting interfaces that include a representation of the budget, including the scheduled periodic execution of the transfer action.

2. The XR device of claim 1, wherein the present eyeprint further includes a pattern of gaze detection, wherein the pattern of gaze detection includes the user gazing, via their eye, at user selected targets displayed on the XR device.

3. The XR device of claim 1, wherein the present eyeprint further includes sobriety detection based on a pupil dilation of the eye of the user, wherein the current password is not accepted while the user is inebriated.

4. The XR device of claim 1, wherein the user account is a payment processing service, and the transfer action is a processed payment that transfers money to the recipient entity.

5. The XR device of claim 4, wherein the process further comprises:
   displaying a confirmation, via the XR device, indicating a source account associated with the user account, a receiving account associated with the indicated recipient entity, and the indicated amount of user account objects, wherein the user account objects are funds to transfer to the indicated recipient entity.

6. A non-transitory computer-readable storage medium storing computer-executable instructions that, when executed by a computing system, cause the computing system to perform a process for generating an XR environment, the process comprising:
   initiating monitoring, to operate in the background of the XR environment by a user-facing camera of a head mounted extended reality device ("XR device"), of an eye of a user wearing the XR device to capture eyeprints, usable for authentication, of the user wearing the XR device;
   performing, by the XR device, an eyeprint based password setup procedure comprising:
      initiating a password selection session on the XR device;
      generating a session password utilizing a session eyeprint of a user wearing the XR device, captured by the user-facing camera of the XR device, wherein the session password is generated according to a set of password determination rules; and
      associating the session password with an account of the user wearing the XR device, wherein the account has one or more recipient entities associated therewith;
   displaying, by the XR device in the XR environment, the one or more recipient entities associated with the account;
   detecting, by the XR device, a transfer action command that is mapped to heightened security and, in response, identifying that an authentication trigger has occurred requiring validation of the current user,
      wherein the detecting the transfer action command, that is mapped to heightened security, comprises detecting, in the XR environment, one or more user hand gesture inputs to which the transfer action, mapped to heightened security, corresponds, and
      wherein the detecting the one or more user hand gesture inputs includes identifying, via an environment-facing camera of the XR device, a hand gesture indicating:
         an amount of user account objects, and
         a recipient entity of the displayed one or more recipient entities;
   in response to the identifying that the authentication trigger has occurred and prior to performing the transfer action, validating, in the XR environment by the XR device, the current user to execute the transfer action by comparing the session password to a current password generated utilizing a present eyeprint of the current user captured by the user-facing camera in a background process of the XR device, wherein the current password is generated according to the set of password determination rules;
   scheduling, via user input received by the XR device, the transfer action to be performed periodically as a scheduled periodic execution of the transfer action;
   updating, by the XR device, a budget based on the scheduled periodic execution of the transfer action; and
   displaying, by the XR device, one or more budgeting interfaces that include a representation of the budget, including the scheduled periodic execution of the transfer action.

7. The non-transitory computer-readable storage medium of claim 6, wherein the indicated amount of user account objects is a budget item, wherein the transfer action is associated with obtaining the budget item, and wherein the process further comprises:
   in response to indicating the budget item, displaying, in the XR environment, a set of predetermined suggested alternatives to the budget item, wherein the predetermined suggested alternatives are smaller expenses than the budget item; and
   inputting gesture commands to display additional information about the predetermined suggested alternatives.

8. The non-transitory computer-readable storage medium of claim 6, wherein the process further comprises:
   receiving, in the XR environment from a GPS receiver, an indication of a set of GPS coordinates at which a specified purchase is allowable, the specified purchase indicating an allowable item;
   in response to the requested transfer action to execute a purchase via payment processing software, evaluating current GPS coordinates and an item being purchased; and
   denying the purchase based on a determination that the purchase is not the specified purchase, based on a mismatch of either:
      the current GPS coordinates and the given set of GPS coordinates; or
      the allowable item and the item being purchased.

* * * * *